US011846749B2

(12) United States Patent
Mukherjee et al.

(10) Patent No.: US 11,846,749 B2
(45) Date of Patent: Dec. 19, 2023

(54) NETWORK WEATHER INTELLIGENCE SYSTEM

(71) Applicant: ZineOne, Inc., Milpitas, CA (US)

(72) Inventors: Arnab Mukherjee, Milpitas, CA (US); Manish Malhotra, Milpitas, CA (US); Priya Saha, Milpitas, CA (US)

(73) Assignee: ZINEONE, INC., Milpitas, CA (US)

( * ) Notice: Subject to any disclaimer, the term of this patent is extended or adjusted under 35 U.S.C. 154(b) by 441 days.

(21) Appl. No.: 16/789,032

(22) Filed: Feb. 12, 2020

(65) Prior Publication Data

US 2021/0215848 A1 Jul. 15, 2021

Related U.S. Application Data

(60) Provisional application No. 62/961,151, filed on Jan. 14, 2020.

(51) Int. Cl.
*G01W 1/10* (2006.01)
*H04W 4/021* (2018.01)
*G06F 16/29* (2019.01)

(52) U.S. Cl.
CPC ............... *G01W 1/10* (2013.01); *G06F 16/29* (2019.01); *H04W 4/021* (2013.01)

(58) Field of Classification Search
CPC ........ G01W 1/10; H04L 67/18; H04W 4/021; G06F 16/29
See application file for complete search history.

(56) References Cited

U.S. PATENT DOCUMENTS

| 8,185,514 | B1 | 5/2012 | Skrenta |
| 8,473,347 | B1 | 6/2013 | Koningstein |
| 8,707,431 | B2 | 4/2014 | Stephens |
| 10,237,215 | B2 | 3/2019 | Pattan |
| 10,567,568 | B2 | 2/2020 | Dotan-Cohen |
| 10,719,854 | B2 | 7/2020 | Chhabra |
| 10,846,604 | B2 | 11/2020 | Malhotra |
| 11,062,360 | B1 | 7/2021 | Donamukkala |
| 2004/0034612 | A1 | 2/2004 | Mathewson |
| 2004/0181340 | A1* | 9/2004 | Smith ............ H04W 4/029 702/3 |
| 2007/0083854 | A1 | 4/2007 | Mayer-Ullmann |
| 2008/0201733 | A1 | 8/2008 | Ertugrul |

(Continued)

FOREIGN PATENT DOCUMENTS

CA   2933649   *  4/2019  ............ H04L 67/18

*Primary Examiner* — Yoshihisa Ishizuka
(74) *Attorney, Agent, or Firm* — Mahamedi IP Law LLP

(57) ABSTRACT

A weather intelligence system retrieves weather forecast data for a number of geographic regions. The weather intelligence system determines, using the weather forecast data for each of the geographic regions, a set of geographic regions predicted to experience a weather anomaly, or unusual weather condition, during a particular time interval. The weather intelligence system determines, through a machine-learning process, whether the weather forecast data indicates conditions that people would generally consider to be unusually hot or cold. The weather intelligence system can then programmatically enable a trigger to transmit a service-related offer associated with the weather anomaly to user devices located within one of the geographic regions where that weather anomaly is determined.

20 Claims, 6 Drawing Sheets

(56) References Cited

U.S. PATENT DOCUMENTS

| | | | |
|---|---|---|---|
| 2010/0138368 A1 | 6/2010 | Stunder | |
| 2010/0228634 A1 | 9/2010 | Ghosh | |
| 2010/0275653 A1* | 11/2010 | Perry | F23N 1/022 65/29.21 |
| 2011/0213655 A1 | 9/2011 | Henkin | |
| 2012/0166268 A1 | 6/2012 | Griffiths | |
| 2012/0284212 A1 | 11/2012 | Lin | |
| 2012/0290521 A1 | 11/2012 | Frank | |
| 2013/0066705 A1 | 3/2013 | Umeda | |
| 2013/0185164 A1 | 7/2013 | Pottjegort | |
| 2013/0238686 A1 | 9/2013 | O'Donoghue | |
| 2013/0325633 A1 | 12/2013 | McAfee | |
| 2014/0130076 A1 | 5/2014 | Moore | |
| 2014/0155094 A1* | 6/2014 | Zises | H04W 4/021 455/456.3 |
| 2014/0221084 A1 | 8/2014 | Morrison, III | |
| 2014/0237595 A1 | 8/2014 | Sridhara | |
| 2014/0349269 A1 | 11/2014 | Canoy | |
| 2015/0212236 A1* | 7/2015 | Haas | G06T 7/20 382/100 |
| 2015/0310334 A1 | 10/2015 | Huang | |
| 2015/0350354 A1 | 12/2015 | Ji | |
| 2016/0005280 A1 | 1/2016 | Laska | |
| 2016/0029055 A1 | 1/2016 | Villegas Nunez | |
| 2016/0063597 A1* | 3/2016 | Goulart | G06Q 50/01 705/26.7 |
| 2016/0189049 A1 | 6/2016 | Silvestri | |
| 2016/0239848 A1 | 8/2016 | Chang | |
| 2016/0242690 A1 | 8/2016 | Principe | |
| 2016/0277264 A1 | 9/2016 | Zarn | |
| 2016/0343093 A1* | 11/2016 | Riland | G06Q 10/04 |
| 2017/0046510 A1 | 2/2017 | Chen | |
| 2017/0140041 A1 | 5/2017 | Dotan-Cohen | |
| 2017/0140437 A1 | 5/2017 | Bhat | |
| 2017/0161782 A1 | 6/2017 | Wigder | |
| 2017/0278062 A1 | 9/2017 | Mueller | |
| 2017/0316343 A1 | 11/2017 | Shamsi | |
| 2017/0372232 A1 | 12/2017 | Maughan | |
| 2018/0046957 A1 | 2/2018 | Yaari | |
| 2018/0081503 A1 | 3/2018 | Green | |
| 2018/0082191 A1 | 3/2018 | Pearmain | |
| 2018/0089737 A1 | 3/2018 | Ali | |
| 2018/0144059 A1 | 5/2018 | Saikia | |
| 2018/0150758 A1 | 5/2018 | Niininen | |
| 2018/0174070 A1 | 6/2018 | Hoffman | |
| 2018/0189793 A1 | 7/2018 | Campos | |
| 2018/0293864 A1* | 10/2018 | Wedig | G08B 13/22 |
| 2018/0300609 A1 | 10/2018 | Krishnamurthy | |
| 2018/0314533 A1 | 11/2018 | Azhen | |
| 2018/0357670 A1 | 12/2018 | DeLuca | |
| 2019/0057071 A1 | 2/2019 | Fleming | |
| 2019/0066163 A1 | 2/2019 | Rubinstein | |
| 2019/0087868 A1 | 3/2019 | Setty | |
| 2019/0205839 A1 | 7/2019 | Dotan-Cohen | |
| 2019/0258818 A1 | 8/2019 | Yu | |
| 2019/0266325 A1 | 8/2019 | Scherman | |
| 2019/0373101 A1 | 12/2019 | Dotan-Cohen | |
| 2019/0388787 A1 | 12/2019 | Padmanabhan | |
| 2020/0081815 A1 | 3/2020 | Malhotra | |
| 2020/0082288 A1 | 3/2020 | Malhotra | |
| 2020/0082294 A1 | 3/2020 | Malhotra | |
| 2020/0092322 A1 | 3/2020 | Boss | |
| 2020/0279339 A1 | 9/2020 | Akutagawa | |
| 2020/0314623 A1* | 10/2020 | Pellegrini | H04W 4/021 |
| 2021/0117833 A1 | 4/2021 | Malhotra | |
| 2021/0312529 A1 | 10/2021 | Malparty | |
| 2022/0067559 A1 | 3/2022 | Malhotra | |
| 2022/0277210 A1 | 9/2022 | Malhotra | |
| 2022/0277211 A1 | 9/2022 | Malhotra | |

* cited by examiner

NETWORK WEATHER INTELLIGENCE SYSTEM

CROSS-REFERENCE TO RELATED APPLICATIONS

This application claims benefit of priority to provisional U.S. Patent Application No. 62/961,151, filed Jan. 14, 2020; the aforementioned priority application being hereby incorporated by reference in its entirety.

BACKGROUND

Machine learning techniques have had increasing relevance to growing technologies and markets. Typically, machine learning systems analyze and act on stored data, sometimes communicated in batch during off-hours.

DETAILED DESCRIPTION

Figure 1:
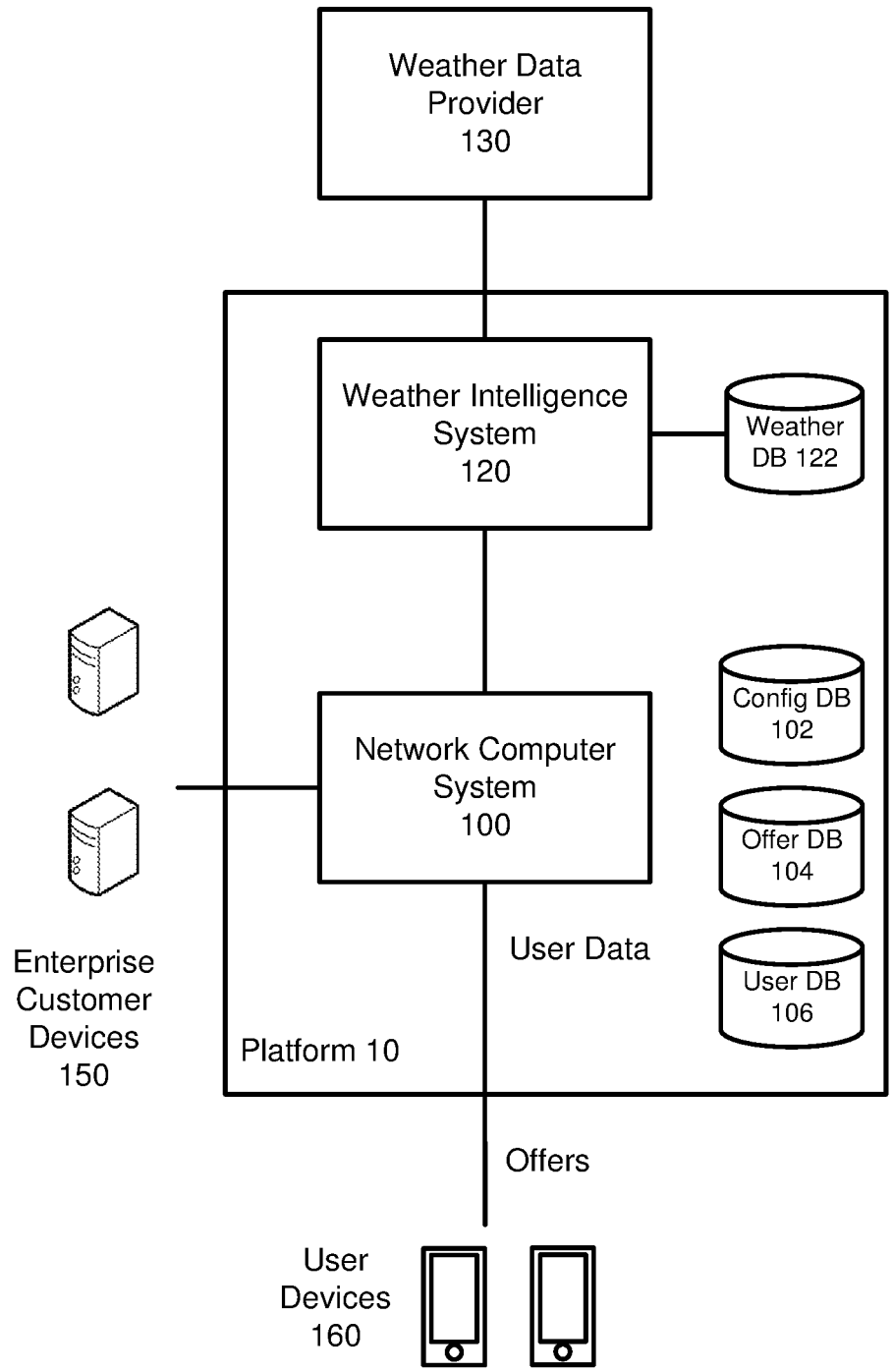
FIG. 1 illustrates a weather intelligence system in the context of a network computer system and platform used for event analysis, according to one or more examples.

Examples provide for a network computer system, and method for implementing a network computer system, to analyze events accumulated over digital channels of an enterprise for the purpose of determining contextual and/or customized outputs that facilitate a desired objective of the enterprise. A network weather intelligence system, as described herein, provides another input to the network computer system for determining the contextual outputs.

The weather intelligence system is a highly scalable, artificial intelligence-driven, service that leverages short-term external weather trends of geographic regions (e.g., zip codes in the United States) to predict when the weather of a region feels significantly different than usual, such as unusually hot or unusually cold. The weather intelligence system extrapolates a user's location and determines what the user feels like at that location at any given point of time. Combined with other information about the user, the network computer system implementing weather intelligence can better determine a customer's probable intentions and likely behavior at that time. This not only helps build a stronger relationship with the customer but also drives profit margins by giving the right offer at the right time that a customer might redeem.

Many conventional enterprise products use weather forecasts to drive business decisions. However, weather services only forecast weather conditions and temperature. They do not determine whether the forecasted temperatures would be considered unusually hot or cold in the context of normal or recent weather for the location. As a result, conventional approaches to weather forecasts may inaccurately estimate the subjective feelings of temperature experienced by people at a location, thereby reducing the effectiveness of any products or services attempting to use weather forecasts to drive business decisions.

In contrast, the weather intelligence system, as described herein, learns short-term weather data patterns and makes predictions based on AI learning techniques. The weather intelligence system analyzes weather data to create insights into whether people would consider the temperature of an area unusually hot or unusually cold. Accordingly, among other advantages, the weather intelligence system uses artificial intelligence techniques to predict when weather can be used for more accurate user intent determinations. In addition, the weather intelligence system can analyze correlations in the weather data to determine when those correlations are predictive of user intent. Enterprises can then use the predictions to identify their customers at unusual weather locations and reach out through networked applications on mobile computing devices to perform various actions.

According to examples, a determination of a user's "intent" includes a determination that the user is deemed to have a particular propensity or predisposition. Still further, in some examples, a determination of a user's "intent" may include a determination of a likelihood that the user will have a particular response to a trigger (e.g., where the trigger is a particular communication, promotion, etc.).

The weather intelligence system retrieves, through an application program interface over a network, weather forecast data for a number of geographic regions. These geographic regions can correspond to zip codes in the United States or to similar subdivision schemes used internationally. The weather intelligence system determines, using the weather forecast data for each of the geographic regions, a set of geographic regions predicted to experience an unusual weather condition, or weather anomaly, during a particular time interval. The weather alert can be the result of abnormal weather conditions such as unusually hot or cold temperatures and inclement weather. The weather intelligence system determines, through a machine-learning process, whether the weather forecast data indicates conditions that people would generally consider to be unusually hot or cold. The weather intelligence system can then programmatically enable a trigger to transmit a service-related offer associated with the unusual weather condition to user devices located within one of the geographic regions where that weather condition is determined.

One or more aspects described herein provide that methods, techniques and actions performed by a computing device are performed programmatically, or as a computer-implemented method. Programmatically means through the use of code, or computer-executable instructions. A programmatically performed step may or may not be automatic.

One or more aspects described herein may be implemented using programmatic modules or components. A programmatic module or component may include a program, a subroutine, a portion of a program, a software component, or a hardware component capable of performing one or more stated tasks or functions. In addition, a module or component can exist on a hardware component independently of other modules or components. Alternatively, a module or component can be a shared element or process of other modules, programs or machines.

Furthermore, one or more aspects described herein may be implemented through the use of instructions that are executable by one or more processors. These instructions may be carried on a computer-readable medium. Machines shown or described with figures below provide examples of processing resources and computer-readable media on which instructions for implementing some aspects can be carried and/or executed. In particular, the numerous machines shown in some examples include processor(s) and various forms of memory for holding data and instructions. Examples of computer-readable media include permanent memory storage devices, such as hard drives on personal computers or servers. Other examples of computer storage media include portable storage units, such as CD or DVD units, flash or solid-state memory (such as carried on many cell phones and consumer electronic devices) and magnetic memory.

Computers, terminals, network enabled devices (e.g., mobile devices such as cell phones) are all examples of machines and devices that utilize processors, memory, and instructions stored on computer-readable media.

Alternatively, one or more examples described herein may be implemented through the use of dedicated hardware logic circuits that are comprised of an interconnection of logic gates. Such circuits are typically designed using a hardware description language (HDL), such as Verilog and VHDL. These languages contain instructions that ultimately define the layout of the circuit. However, once the circuit is fabricated, there are no instructions. All the processing is performed by interconnected gates.

System Overview

FIG. 1 illustrates a weather intelligence system 120 in the context of a network computer system 100 and platform 10 used for event analysis, according to one or more examples. In particular, the network computer system 100 can implement processes to capture events in real-time, across one or multiple channels, and further to implement processes to analyze and act on the detected events. With respect to examples as described, the network computer system 100 can be implemented on a server, on a combination of servers, and/or on a distributed set of computing devices which communicate over a network such as the Internet. Still further, some examples provide for the network computer system 100 to be distributed across one or more servers and/or mobile devices. In some variations, the network computer system 100 is implemented as part of, or in connection with a network system, where, for example, end users utilize applications running on mobile devices to engage in either online or real-world services (e.g., shopping in store or online).

The platform 10 provides a foundation to build next-generation, AI-driven engagement applications that can analyze continuous interactions between customers and their environment, learn from these interactions, and take adaptive actions in real-time. The network computer system 100 is designed with a low-latency, event-driven architecture to process a high velocity of events coming from digital channels and Internet-of-things (IoT) devices, build a cross-channel layer to maintain the individualized state of millions of customers, analyze incoming event streams across both immediate & historical timespans to identify triggers, and use those triggers to initiate personalized actions with customers wherever they may be.

The network computer system 100 can provide user context data from real-time streams, historical datastores, and enterprise systems for a range of events and event types. In particular, the network computer system 100 can implement learning and analysis for processing event patterns using a real-time response framework. Depending on the implementation, the real-time response framework can detect and respond to user events in seconds.

In examples, the network computer system 100 can implement a framework to generate a real-time response to a particular trigger or event, for the purpose of causing or influencing a desired outcome from the end user. While the response to the particular trigger or event can be generated in real-time, the response can also be tailored or otherwise configured based on historical information about the end user who is the subject of the response. Accordingly, as described with various examples, the network computer system 100 can utilize a combination of information that is obtained in real-time as well as from prior time intervals (e.g., historical information), in order to generate a real-time response to a particular trigger or event. One source of information for the network computer system 100 is the weather intelligence system 120, which enables the network computer system 100 to generate offers based on weather-related triggers.

The weather intelligence system 120 retrieves weather forecast data from a weather data provider 130 according to a schedule (e.g., twice a week on Tuesdays and Fridays). In one implementation, the weather intelligence system 120 accesses the weather forecast data through an application program interface (API) implemented by the weather data provider 130 over a network. Once a geographic region identifier (e.g., a zip code) is passed in the header of the API, the weather data provider 130 returns the weather forecast data for that zip code. The weather intelligence system 120 can receive a 5-day forecast, divided into eight 3-hour increments, for each of the geographic regions being tracked in one of a number of data formats, such as JSON, XML, or HTML. The weather forecast data can include information such as temperature, atmospheric pressure, humidity, cloud cover, wind speed and direction, and precipitation conditions.

Using the weather forecast data, the weather intelligence system 120 runs an AI model to predict whether a geographic region will experience an unusual weather condition, such as being hotter or colder than its regular weather conditions. The AI model learns the short-term weather data patterns over the last few days at a given time and makes predictions based on the learning.

The weather intelligence system 120 is hosted on a cloud production server. Due to the huge amount of weather data that are consumed from the weather API and the complex processing needed, it is important to have the service up and running in a scalable environment. In some aspects, the weather intelligence system 120 is connected to a weather database 122 that stores historical weather data, the weather forecast data, and weather predictions for unusual weather conditions for each of the geographic regions. In one implementation, the weather intelligence system 120 operates on over 42,000 zip codes. In further implementations, the weather intelligence system can use city names, latitude/longitude coordinates, or other schemes to divide a larger area into geographic regions.

According to examples, the network computer system 100 can implement processes that communicate with applications running on the user devices 160 as well as processes that are provided by network or web resources of an enterprise. For example, the network computer system 100 can include a mobile device application connector that is implemented using a combination of a network or server-side process (or set of processes) and an application program interface (API) of a corresponding user device 160.

The network computer system 100 includes multiple different connectors to receive and record activity information from different kinds of resources, such as from user devices 160 and from enterprise customer devices 150. In examples, the activity information includes data which identifies an activity the end user performed. The activity information can also include one or more user-identifiers for the respective user that performed the corresponding activity. By way of example, the activity information can include one or more identifiers that reflect any one of a user account, a user-operated device, a session identifier (e.g., such as identified by cookie information stored on a user device), and/or a user signature determined from multiple attributes of the end user's interaction with the respective resource of the enterprise. Additionally, the activity information can include descriptive information about the activity performed. For example, the activity information can include descriptive information relating to an item that is the subject of the end user activity. Still further, the activity information can include contextual information (e.g., time of day, day of week, calendar day, etc.) related to an activity that the end user is detected as having performed.

In some examples, an activity that a given user is detected as performing can be in connection with the end user's access or use of an enterprise customer device 150 (e.g., website, mobile device application, chatbot, etc.). For example, the mobile device application connector can communicate with a program that executes as part of a mobile application of an enterprise, to receive activity information that pertains to the end user's interaction with the enterprise's mobile application. As an addition or alternative, the mobile device application connector can interact with (i) third-party applications running on the corresponding mobile device, and/or (ii) one or more APIs that are available on the mobile device to obtain activity information from device resources (e.g., satellite receiver to sample for location information, accelerometer and/or gyroscope to sample for movement information, camera, microphone, etc.) and/or software resources (e.g., third-party applications). In such examples, the determined activity information relates to activities which the end user performs on a corresponding mobile device, distinct or independent from any enterprise mobile device application. For example, the mobile device application connector can communicate with one or more APIs on the corresponding mobile device to determine activity information that reflects a user's interaction with a website and/or mobile device application, as well as a location of the mobile device (e.g., as determined from the mobile device satellite receiver). As another example, the mobile device application connector can include an API provided with a corresponding mobile application to obtain sensor information by, for example, reading from a satellite receiver or other location-aware resource of the mobile device, and/or sampling an accelerometer and/or gyroscope of the mobile device. Still further, the mobile device application connector can interface with other programmatic resources of the mobile device, such as with third-party applications or services which run on the mobile device.

In variations, the connectors can include other device and/or programmatic interfaces that execute on a user-operated device. For example, the connectors can include programmatic interfaces which execute to communicate with processes running on different types of user devices (e.g., desktop computer, wearable device). In such cases, the connectors can communicate to receive activity information from multiple types of user devices (e.g., desktop computer, wearable device, etc.).

In some aspects, enterprise customers can log into the platform 10 in order to create custom offers to be sent in response to one or more triggers and business rules. For example, in the context of the weather intelligence system 120, unusually hot or unusually cold weather can be a trigger. Business rules can include any configurable options and conditions that an enterprise may place on an offer, such as requiring that a user be within a certain distance of a retail location or requiring that the user not be recognized as a regular customer of the business. Upon activation of a trigger and satisfaction of any business rules associated with the offer, the network computer system 100 may send the offer to a user device 160.

The platform 10 can include various databases to store data used in the network computer system 100 and the weather intelligence system 120. These databases can include a configuration database 102 to store parameters, business rules, etc., an offer database 104 to store text, media files, and other information related to offers that can be sent to users, and a user database 106 to store profiles of users.

Figure 2:
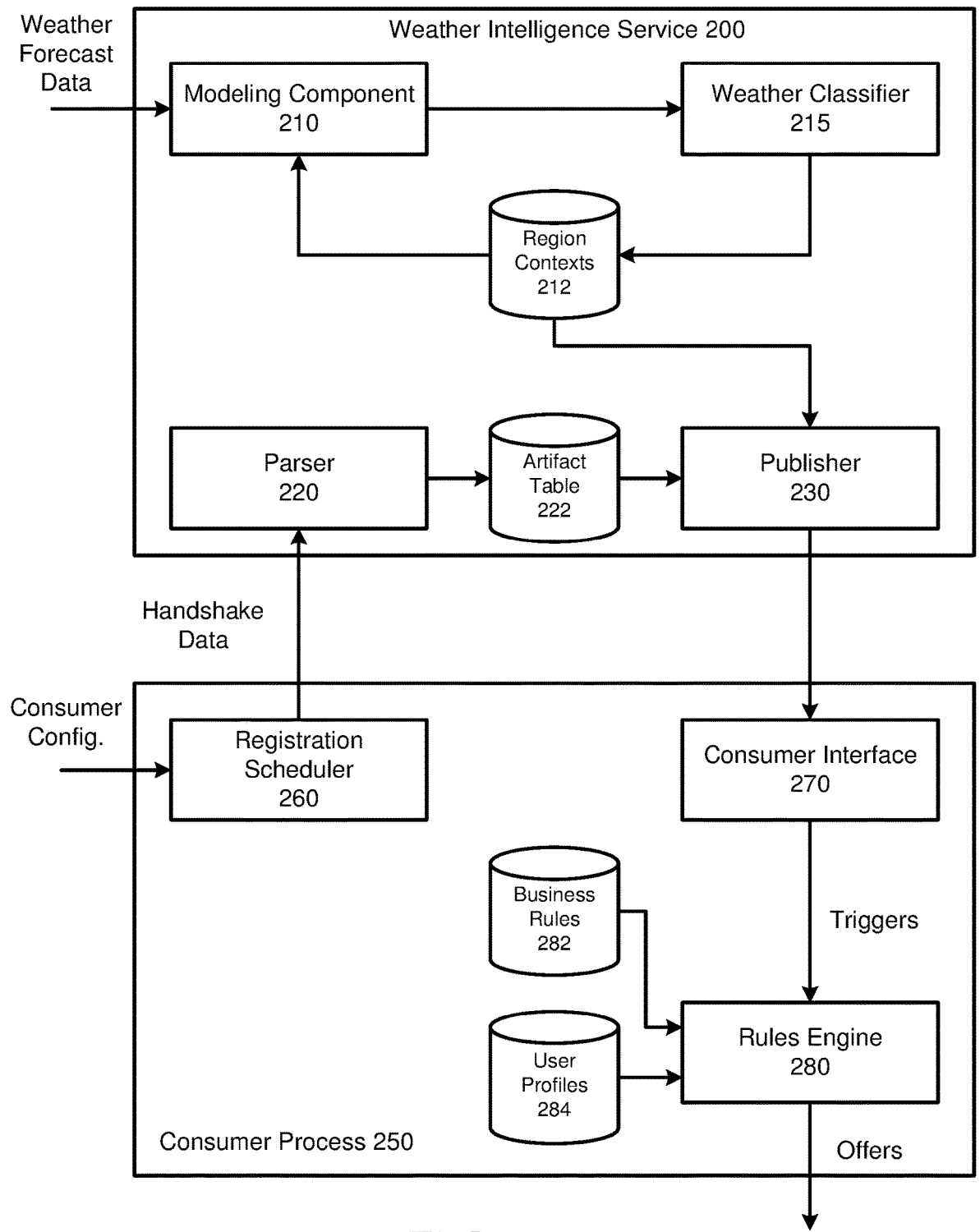
FIG. 2 illustrates a weather intelligence service used to generate weather-related events within a network computer system.

FIG. 2 illustrates a weather intelligence service 200 and corresponding consumer process 250 used to generate weather-related events within a network computer system. In some aspects, the weather intelligence service 200 and consumer process 250 implement a weather intelligence system and act as part of a larger customer engagement platform, such as the platform 10 illustrated in FIG. 1.

In one aspect, a consumer process 250 registers to sign up for the weather intelligence service 200 in order to receive, on a regular schedule, a list of geographic regions experiencing a specific type of unusual weather condition. In order to register, a handshake happens between a given consumer process 250 and the weather intelligence service 200 (i.e., the service provider) so that the service provider uses the right namespaces for the consumers and the right services. In addition, this also helps the service provider to match the right set of zip codes to the right consumer process.

Prior to the handshake process, a registration scheduler 260 receives configuration data, including the type of weather trigger (e.g., unusually hot, unusually cold, or inclement) that consumer process 250 should be configured to listen to and sign up credentials for the trigger. In one implementation, the registration scheduler 260 executes every 3 hours and posts the sign-up credentials as handshake data to the service provider. A parser 220 on the service provider side parses the handshake data, extracts artifact details identifying the type of weather trigger and the consumer process 250, and saves the details in an artifact table 222 for use by a publisher process 230 after processing weather forecast data.

The weather intelligence service 200 retrieves weather forecast data from a weather data provider. In one implementation, the forecast data includes the mean temperature for a given geographic region, divided into eight 3-hour intervals per day. This forecast data is then passed to a modeling component 210 for processing.

In one implementation, the modeling component 210 calculates a moving average of the temperature over the forecast period on a sliding window of two days for each of the 3-hour intervals. A weather classifier 215 then checks the temperature of each interval compared to the sliding window moving average in order to classify the weather condition for that interval. The weather condition classifications can include unusual weather conditions such as: unusually hot, unusually cold, or inclement, as well as an unmatched classification for clear conditions with temperatures that do not match any of the rules for the other conditions.

The weather classifier 215 can classify a time interval as unusually hot when the weather is clear and two additional conditions are met: first, the forecasted mean temperature of the interval is equal to or greater than the sliding interval temperature of the previous two days; and second, the forecasted temperature is higher than a programmed threshold for an unusually hot condition (e.g., 80 degrees Fahrenheit, 85 degrees Fahrenheit, etc.).

The weather classifier 215 can classify a time interval as unusually cold when the weather is clear and two additional conditions are met: first, the forecasted mean temperature of the interval is equal to or less than the sliding interval temperature of the previous two days; and second, the forecasted temperature is lower than a programmed threshold for an unusually cold condition (e.g., 50 degrees Fahrenheit, 45 degrees Fahrenheit, etc.).

The weather classifier 215 can classify a time interval as having inclement weather when the forecast indicates that the time interval is expected to experience precipitation. Only certain types of precipitation (e.g., snow) may be classified as inclement, or there may be threshold levels of precipitation required (e.g., 0.1 inches of rain) for the weather classifier 215 to classify an interval as inclement.

In some variations, the weather classifier 215 can classify the temperature of a time interval as unusually hot or cold based on a calculated rate of change in the temperature of a geographic region over time. For example, a gradient of more than 30 degrees Fahrenheit over a given time interval may be deemed to be unusually hot, in combination with the programmed hot threshold, the sliding interval temperatures, or both.

Upon classifying each of the time intervals from the weather forecast data for a given geographic region, the weather classifier 215 updates a region context 212 for that geographic region with the classifications. These classifications can also feed back into the modeling component 210 in order to analyze correlations and determine thresholds for unusual temperatures, such as the gradients that may indicate a time interval is unusually hot or cold.

At a regular interval of time (e.g., once every 3 hours), the publisher 230 queries the region contexts 212 and artifact table 222 to determine which consumer processes 250 to send which lists of geographic regions. The publisher 230 extracts the artifact data of each registered service by the right namespaces and the right consumers and uses that information to identify the consumer processes 250 to receive lists of geographic regions experiencing an unusual weather condition for a given time period. For example, the publisher 230 can create three lists from the region context 212 data: a list of geographic regions determined to be unusually hot, a list of geographic regions determined to be unusually cold, and a list of geographic regions determined to be inclement. For each consumer process 250 registered to receive lists of unusually hot regions, the publisher 230 sends the unusually hot region list to that consumer process 250.

A consumer interface 270 receives the appropriate list of geographic regions from the service provider and creates corresponding weather-related triggers for each of the geographic regions on the list. A rules engine 280 can then index user profiles from a database of user profiles 284 to determine which users registered with the environment are currently located within (or near) any of the geographic regions on the list. The rules engine 280 can also filter the user profiles by one or more programmed business rules 282, which enterprise customers can configure to target desired characteristics for offer recipients. For example, a retail location may configure an offer to send a push notification offering a discount on cold drinks to user devices of registered users within an unusually hot geographic region, but only for users who are not already regular customers of the business.

In some variations, the consumer interface 270 on the consumer process 250 receives a notification that a user has breached a geofence. As used herein, a geofence represents a virtual perimeter for a real-world geographic area and can be dynamically generated or formed from a predefined boundary or set of boundaries. For example, a geofence may surround a place of business in a circle with a given radius (e.g., 100 feet, 500 feet, etc.). Thus, when the platform detects that a user device has crossed the virtual perimeter of the geofence and is near the place of business, the platform can generate a notification to the consumer process 250. The notification may include an identifier for the user device and other data, including the location of the user device, or the consumer process 250 can retrieve the location of the user device through the database of user profiles 284 and the identifier.

The consumer interface 270 can call the weather intelligence service 200 provider and request the current weather condition for the location of the user device which breached the geofence. The weather intelligence service 200 looks up the weather condition in the database of region contexts 212 and returns the current weather condition for the location to the consumer interface 270. The rules engine 280 determines whether the trigger of the user device breaching the geofence and the weather condition of the location of the user device matches the business rules in the database of business rules 282 in order to qualify for one or more offers.

In a further implementation, location history information of individual users from their user profiles 284 may be considered in determining whether that user qualifies for a weather-related offer. Accordingly, the system can reference where a user has been over the last few days to determine if the user may feel hot or cold at their current location and time based on the difference in temperatures between the user's current location and their past locations. For example, the weather classifier 215 may determine that a zip code in Seattle is unusually hot, but a user visiting Seattle who was in Houston the day before may disagree. Based on a comparison of temperatures between today in Seattle and yesterday in Houston, the system may determine that the user does not meet the rule criteria for a hot weather-related offer, or vice versa.

Methodology

Figure 3:
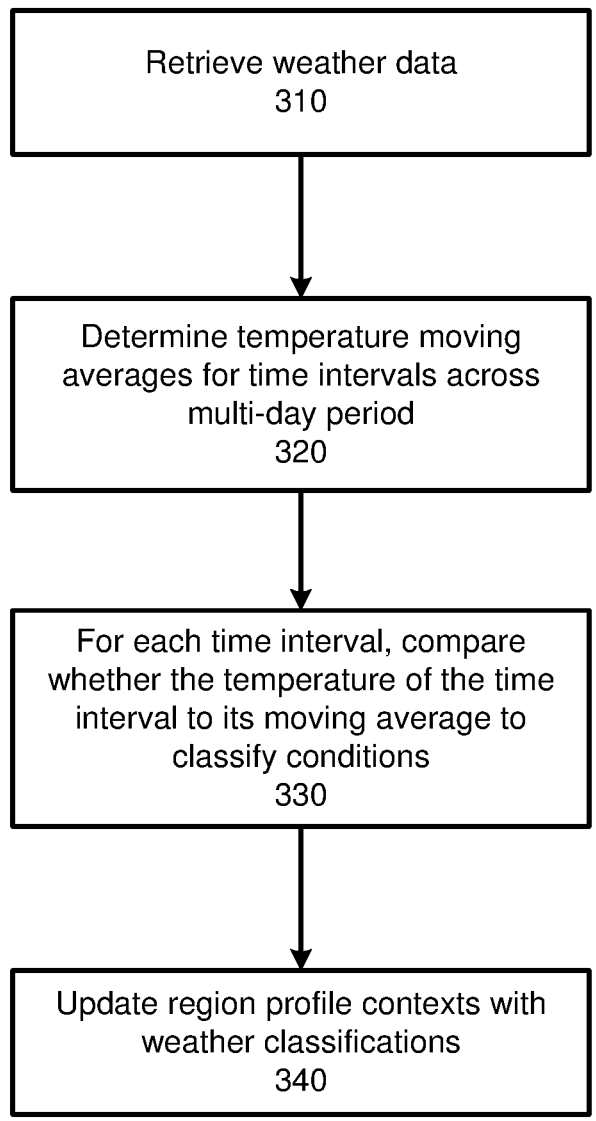
FIG. 3 illustrates an example method for determining weather-related events.
Figure 4:
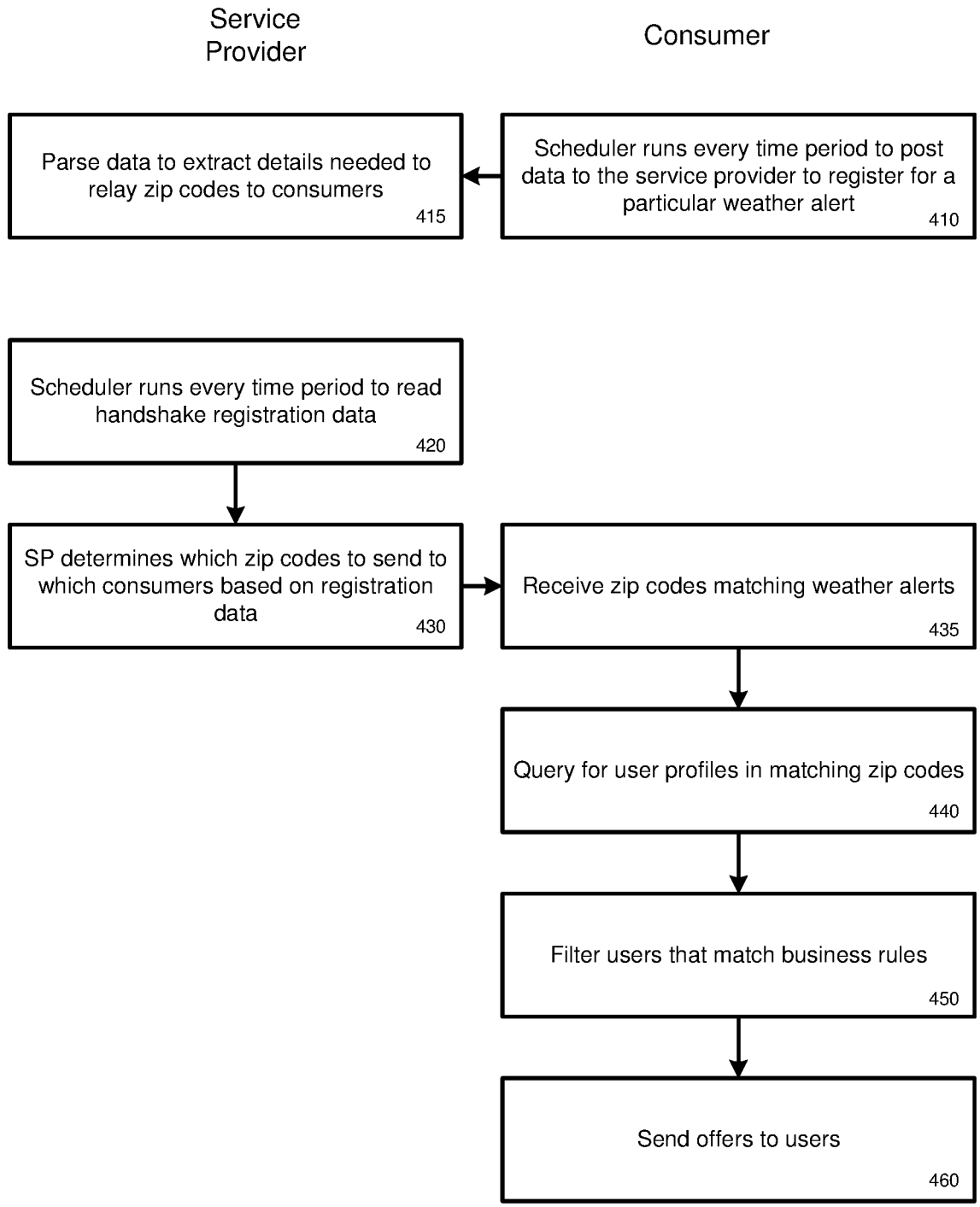
FIG. 4 illustrates an example method for using weather-related events.
Figure 5:
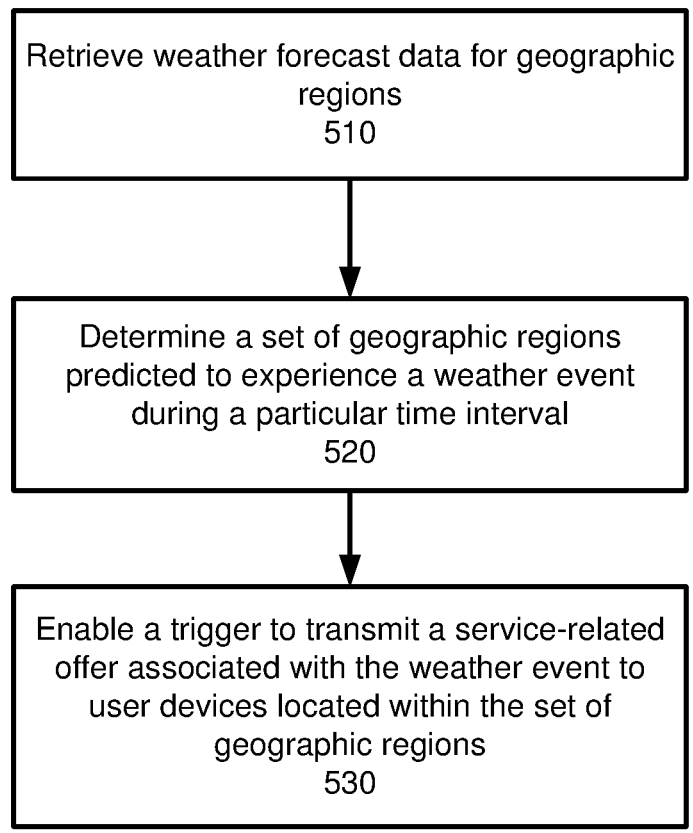
FIG. 5 illustrates an example method for operating a network weather intelligence system.

FIG. 3 illustrates an example method for determining weather-related events. FIG. 4 illustrates an example method for using weather-related events. FIG. 5 illustrates an example method for operating a network weather intelligence system. While operations of the methods are described below as being performed by specific components, modules, or systems of the network computer system 100, weather intelligence service 200, and consumer process 250, it will be appreciated that these operations need not necessarily be performed by the specific components identified, and could be performed by a variety of components and modules, potentially distributed over a number of machines. Accordingly, references may be made to specific elements for the purpose of illustrating suitable components or elements for performing a step or sub step being described. Alternatively, at least certain ones of the variety of components and modules described can be arranged within a single hardware, software, or firmware component.

It will also be appreciated that some of the steps of this method may be performed in parallel or in a different order than illustrated.

With reference to FIG. 3, a weather intelligence system retrieves weather data from a weather data provider, such as over a network through an application program interface (310). The weather intelligence system determines temperature moving averages for time intervals across a multi-day period (320). For each time interval, the weather intelligence system determines whether the temperature of the time interval exceeds its moving average, combined with programmed floor and ceiling thresholds, in order to classify the time interval as unusually hot or cold (330). The weather intelligence system then updates region profile contexts with the weather classifications as appropriate (340).

With reference to FIG. 4, a handshake is performed between the service provider (i.e., the weather intelligence service) and the consumer process so that the service provider uses the right namespaces for the consumers and the right services (410). Additionally, this also helps the service provider to match the right set of zip codes (or other geographic region dividers) to the right consumer process. Accordingly, a consumer-side scheduler runs every time period (e.g., 3 hours) to post data to the service provider to register for a particular weather condition alert. The service provider parses data to extract details needed to relay zip codes to consumers (415).

A scheduler on the service provider side runs every time period to read the handshake registration data from the previously performed handshake. Then, based on the handshake registration data, the service provider determines which zip codes to send to which consumer processes (420).

For any given consumer process, the consumer receives a list of zip codes from the service provider that match the unusual weather condition alert, or anomaly, that the consumer process is registered to receive (430). Upon receiving the list of zip codes (435), the consumer process queries a user database for user profiles that match users currently located in (or near) any of the zip codes on the list (440).

In some aspects, offers are only sent to qualified users that are determined from any business rules set for the offer. Accordingly, the consumer process can filter the user profiles for to determine qualified users that match the business rules (450).

Once the process has filtered users that match the business rules, offers are sent to the appropriate users (460). In some implementations, offers can cause a user device to display the offer on a user interface of an application (e.g., through the user of a push notification) registered with the platform environment. In other implementations, the offer is provided through text message, email, or other forms.

With reference to FIG. 5, a weather intelligence system retrieves weather forecast data for geographic regions (510).

The weather intelligence system determines a set of geographic regions predicted to experience a weather event during a particular time interval (520).

The weather intelligence system enables a trigger to transmit a service-related offer associated with the weather event to user devices located within the set of geographic regions (530).

Computer System

Figure 6:
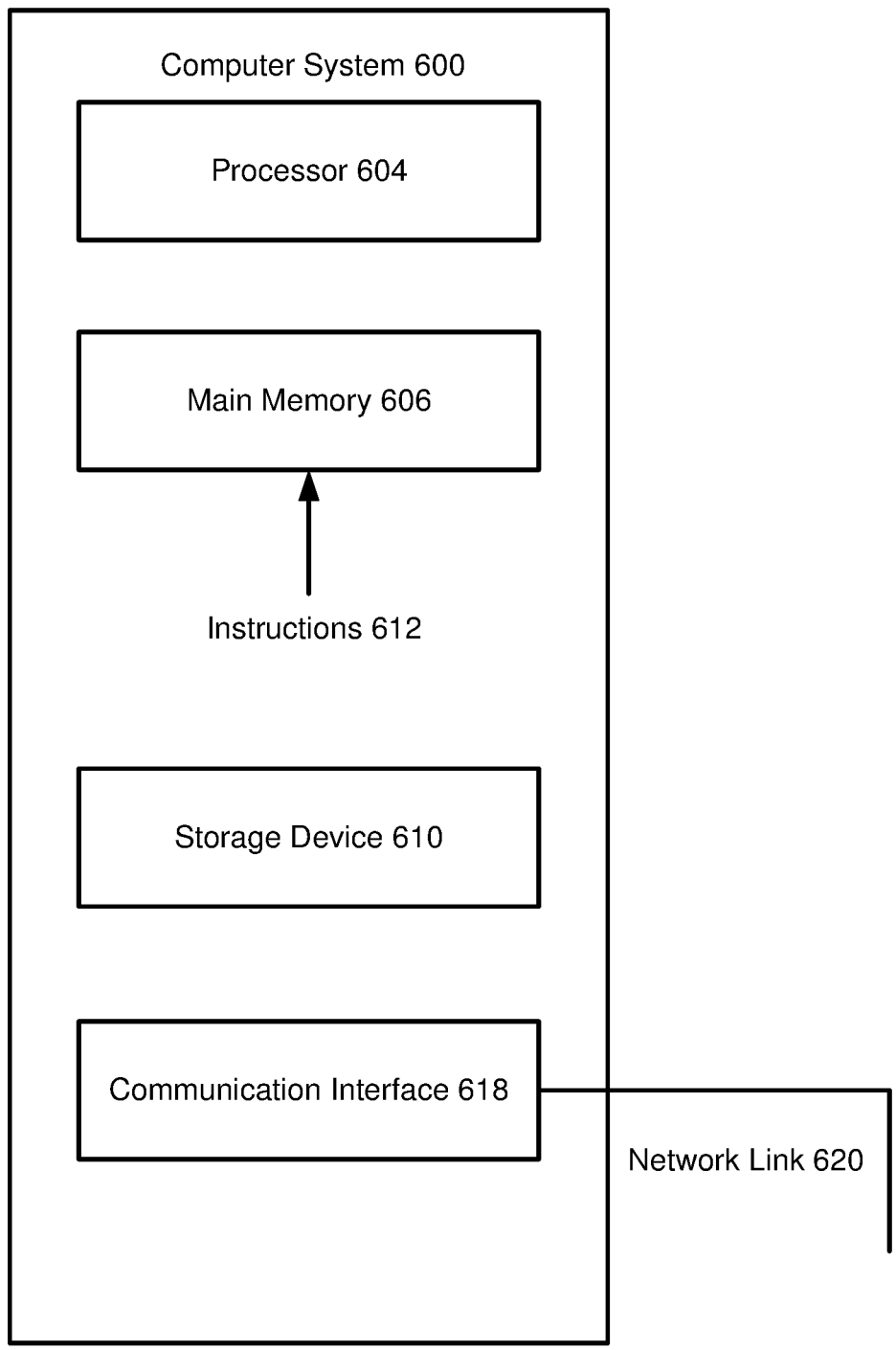
FIG. 6 is a block diagram that illustrates a computer system upon which aspects described herein may be implemented.

FIG. 6 is a block diagram that illustrates a computer system upon which aspects described herein may be implemented. For example, in the context of FIG. 1, the network computer system 100 may be implemented using one or more servers such as described by FIG. 6.

In an aspect, the computer system 600 includes a processor 604, memory 606 (including non-transitory memory), storage device 610, and communication interface 618. Computer system 600 includes at least one processor 604 for processing information. Computer system 600 also includes the main memory 606, such as a random-access memory (RAM) or other dynamic storage device, for storing information and instructions to be executed by processor 604. Main memory 606 also may be used for storing temporary variables or other intermediate information during execution of instructions to be executed by processor 604. Computer system 600 may also include a read only memory (ROM) or other static storage device for storing static information and instructions for processor 604. The storage device 610, such as a magnetic disk or optical disk, is provided for storing information and instructions. The communication interface 618 may enable the computer system 600 to communicate with one or more networks through use of the network link 620 and any one of a number of well-known transfer protocols (e.g., Hypertext Transfer Protocol (HTTP)). Examples of networks include a local area network (LAN), a wide area network (WAN), the Internet, mobile telephone networks, Plain Old Telephone Service (POTS) networks, and wireless data networks (e.g., WiFi and WiMax networks).

Examples described herein are related to the use of computer system 600 for implementing the techniques described herein. According to one aspect, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative aspects, hardwired circuitry may be used in place of or in combination with software instructions to implement aspects described herein. Thus, aspects described are not limited to any specific combination of hardware circuitry and software.

Although illustrative aspects have been described in detail herein with reference to the accompanying drawings, variations to specific examples and details are encompassed by this disclosure. It is intended that the scope of examples described herein be defined by claims and their equivalents. Furthermore, it is contemplated that a particular feature described, either individually or as part of an aspect, can be combined with other individually described features, or parts of other aspects. Thus, absence of describing combinations should not preclude the inventor(s) from claiming rights to such combinations.

What is claimed is:

1. A system comprising:
   a memory resource to store instructions; and
   one or more processors using the instructions stored in the memory resource to perform operations including:
   retrieving, through an application program interface over a network, weather forecast data for a plurality of geographic regions;
   determining, using the weather forecast data for each of the plurality of geographic regions, a set of geographic regions predicted to experience a weather anomaly during a particular time interval;
   upon determining that a user device has crossed a geofence within a region of the set of geographic regions predicted to experience the weather anomaly, retrieving location history information for the user device to determine a prior location of the user device at a prior period of time; and based on a comparison of the weather forecast data for the region to prior weather forecast data for the prior location during the prior period of time, transmitting, automatically, a service-related offer, from a plurality of service-related offers associated with the weather anomaly, to the user device, wherein the service-related offer triggers the user device to display the service-related offer on a user interface of an application.

2. The system of claim 1, wherein determining that one of the set of geographic regions is predicted to experience the weather anomaly includes:

determining, using the weather forecast data for the geographic region, (i) a moving average temperature for the particular time interval, and (ii) whether a forecast temperature for the particular time interval exceeds the moving average temperature and meets a programmed threshold temperature for the weather anomaly.

3. The system of claim 2, wherein the one or more processors use the instructions stored in the memory resource to perform further operations including:

upon determining that the forecast temperature for the particular time interval exceeds the moving average temperature and exceeds the programmed threshold temperature for unusually hot weather, classifying the particular time interval as unusually hot.

4. The system of claim 2, wherein the one or more processors use the instructions stored in the memory resource to perform further operations including:

upon determining that the forecast temperature for the particular time interval is below the moving average temperature and below the programmed threshold temperature for unusually cold weather, classifying the particular time interval as unusually cold.

5. The system of claim 2, wherein the moving average temperatures are calculated over a two-day sliding window.

6. The system of claim 1, wherein locations of the user devices are determined based on location data received from the user devices.

7. The system of claim 1, wherein the geographic regions each correspond to an area assigned a specific zip code.

8. A method, implemented by one or more processors, comprising:

retrieving, through an application program interface over a network, weather forecast data for a plurality of geographic regions;

determining, using the weather forecast data for each of the plurality of geographic regions, a set of geographic regions predicted to experience a weather anomaly during a particular time interval;

upon determining that a user device has crossed a geofence within a region of the set of geographic regions predicted to experience the weather anomaly, retrieving location history information for the user device to determine a prior location of the user device at a prior period of time; and based on a comparison of the weather forecast data for the region to prior weather forecast data for the prior location during the prior period of time, transmitting, automatically, a service-related offer, from a plurality of service-related offers associated with the weather anomaly, to the user device, wherein the service-related offer triggers the user device to display the service-related offer on a user interface of an application.

9. The method of claim 8, wherein determining that one of the set of geographic regions is predicted to experience the weather anomaly includes:

determining, using the weather forecast data for the geographic region, (i) a moving average temperature for the particular time interval, and (ii) whether a forecast temperature for the particular time interval exceeds the moving average temperature and meets a programmed threshold temperature for the weather anomaly.

10. The method of claim 9, further comprising:

upon determining that the forecast temperature for the particular time interval exceeds the moving average temperature and exceeds the programmed threshold temperature for unusually hot weather, classifying the particular time interval as unusually hot.

11. The method of claim 9, further comprising:

upon determining that the forecast temperature for the particular time interval is below the moving average temperature and below the programmed threshold temperature for unusually cold weather, classifying the particular time interval as unusually cold.

12. The method of claim 9, wherein the moving average temperatures are calculated over a two-day sliding window.

13. The method of claim 8, wherein location of the user device is determined based on location data received from the user device.

14. The method of claim 8, wherein the geographic regions each correspond to an area assigned a specific zip code.

15. A non-transitory computer-readable medium that stores instructions, executable by one or more processors, to cause the one or more processors to perform operations that comprise:

retrieving, through an application program interface over a network, weather forecast data for a plurality of geographic regions;

determining, using the weather forecast data for each of the plurality of geographic regions, a set of geographic regions predicted to experience a weather anomaly during a particular time interval;

upon determining that a user device has crossed a geofence within a region of the set of geographic regions predicted to experience the weather anomaly, retrieving location history information for the user device to determine a prior location of the user device at a prior period of time; and based on a comparison of the weather forecast data for the region to prior weather forecast data for the prior location during the prior period of time, transmitting, automatically, a service-related offer, from a plurality of service-related offers associated with the weather anomaly, to the user device, wherein the service-related offer triggers the user device to display the service-related offer on a user interface of an application.

16. The non-transitory computer-readable medium of claim 15, wherein determining that one of the set of geographic regions is predicted to experience the weather anomaly includes:

determining, using the weather forecast data for the geographic region, (i) a moving average temperature for the particular time interval, and (ii) whether a forecast temperature for the particular time interval exceeds the moving average temperature and meets a programmed threshold temperature for the weather anomaly.

17. The non-transitory computer-readable medium of claim 16, wherein the one or more processors use the instructions to perform further operations including:
- upon determining that the forecast temperature for the particular time interval exceeds the moving average temperature and exceeds the programmed threshold temperature for unusually hot weather, classifying the particular time interval as unusually hot.

18. The non-transitory computer-readable medium of claim 16, wherein the one or more processors use the instructions to perform further operations including:
- upon determining that the forecast temperature for the particular time interval is below the moving average temperature and below the programmed threshold temperature for unusually cold weather, classifying the particular time interval as unusually cold.

19. The non-transitory computer-readable medium of claim 16, wherein the moving average temperatures are calculated over a two-day sliding window.

20. The non-transitory computer-readable medium of claim 15, wherein locations of the user devices are determined based on location data received from the user devices.

\* \* \* \* \*